Figure 1:
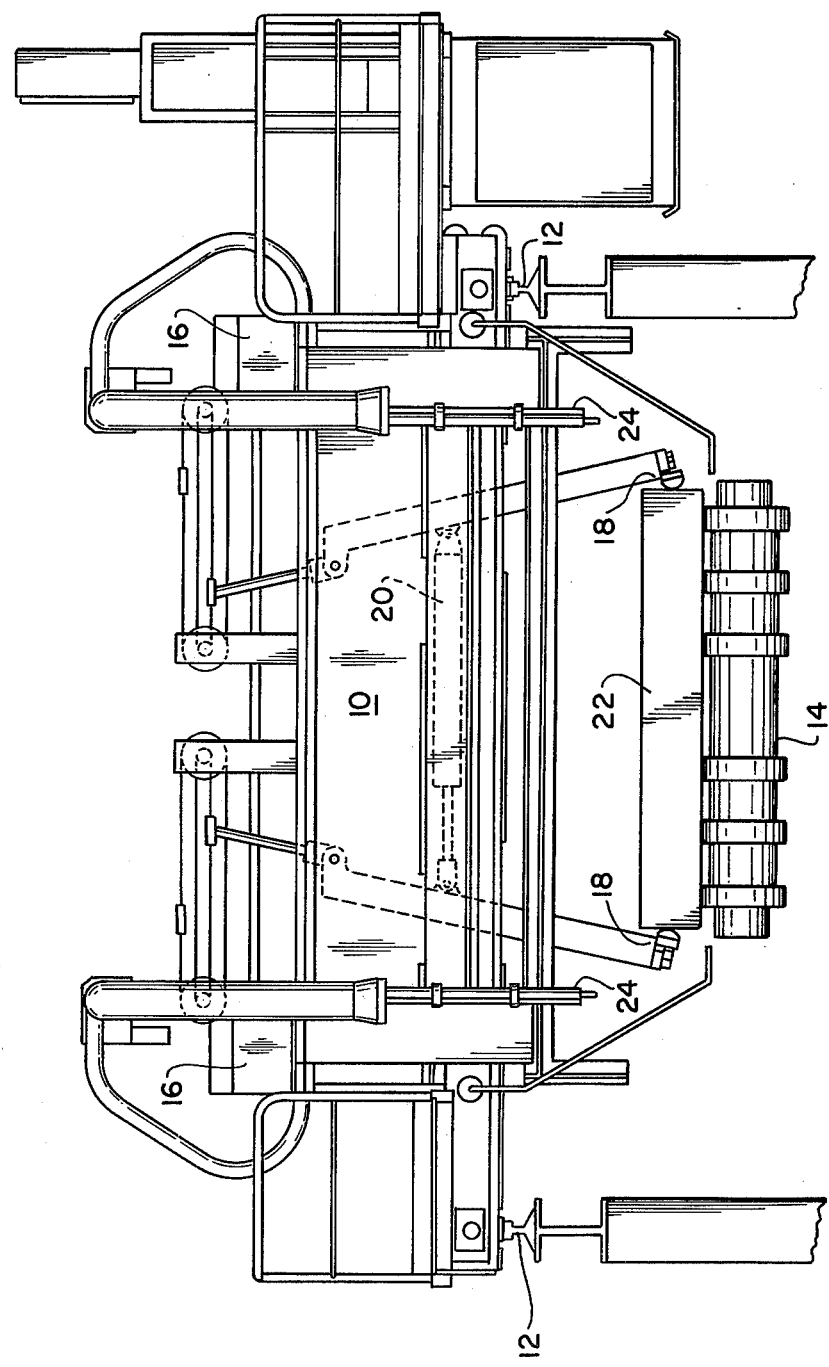

United States Patent [19]

Pillon

[11] 4,201,371
[45] May 6, 1980

[54] CONTROL UNIT FOR TORCH-CUTTING MACHINES USED IN CONTINUOUS CASTING

[75] Inventor: René Pillon, Villeneuve le Roi, France

[73] Assignee: Fives-Cail Babcock, Paris, France

[21] Appl. No.: 14,084

[22] Filed: Feb. 22, 1979

[30] Foreign Application Priority Data

Mar. 10, 1978 [FR] France ............................. 78 06935

[51] Int. Cl.² .............................................. B23K 31/10
[52] U.S. Cl. ...................................................... 266/50
[58] Field of Search .......................................... 266/50

[56] References Cited

U.S. PATENT DOCUMENTS

| 3,558,117 | 1/1971 | Hess | 266/50 |
| 3,704,012 | 11/1972 | Pfeuffer et al. | 266/50 |

FOREIGN PATENT DOCUMENTS 1563123  2/1968  France.

*Primary Examiner*—L. Dewayne Rutledge
*Assistant Examiner*—John P. Sheehan
*Attorney, Agent, or Firm*—Kurt Kelman

[57] ABSTRACT

Control unit for torch-cutting machines consisting of bars which grip the sides of the cast product, and at least one cutting-torch carriage, movable in a direction at right angles to the movement of the machine. This control unit consists of a first element carried by the cutting-torch carriage and a second element which combines with the first to halt the carriage when it reaches a predetermined position.

This unit is characterized by the fact that the second element is kinematically linked to the grip-bar situated on the side of the cast where the cut will begin, in such a way that the movements of the grip-bar move this second element in a direction parallel to the path of the cutting-torch carriage, at a speed equal to and in the same direction as the component, parallel to the path of the cutting-torch carriage, of the speed of the end of the grip-bar which comes into contact with the cast product.

The invention can be used in the field of continuous casting of metals, particularly steel.

5 Claims, 2 Drawing Figures

CONTROL UNIT FOR TORCH-CUTTING MACHINES USED IN CONTINUOUS CASTING

This invention concerns torch-cutting machines used in continuous casting to cut the cast product into sections of a predetermined length.

These machines consist of:
- a frame, movable above the cast product discharge conveyor
- bars, hinged onto this frame, which grip the sides of the cast product and ensure that the machine and the cast product move along together
- at least one cutting-torch carriage, movable in a direction at right angles to the movement of the machine
- some means of controlling the movement of the cutting-torch carriage and of igniting the cutting-torch so that it is lit when it reaches the edge of the cast product, remains in this position for a pre-set period of time to pre-heat the cast product and is then set in motion so that it cuts the cast product.

If there is only one cutting-torch, it must be moved from one edge of the cast product to the other. If there are several, each one is moved across only a fraction of the width of the cast product. In all cases, when the cutting-torch has reached the furthest point of its outward travel, it is extinguished and returns to its starting position.

If the edges of the cast product are not perfectly straight and/or if the position of the cast product on the discharge conveyor is not constant, it is necessary to provide an automatic control unit to ensure that the cutting-torch stops at the edge of the cast product. One suggested way of achieving this is to mount the cutting-torch carriage and its travel mechanism onto a mobile piece of apparatus, linked to one of the grip-bars in such a way that, the carriage having reached the end of its return travel, the cutting-torch is already positioned by the edge of the cast product when the grip-bar comes to rest against this edge. This solution has the disadvantage of complicating the construction of the machine, as the cutting-torch carriage has to be mounted onto a mobile piece of apparatus and a mechanical connection is necessary between this piece of apparatus and the grip-bars.

Another solution is to place the cutting-torch between the grip-bars and to provide these bars with stops which restrict the movement of the torch. If this solution is employed, the grip-bars are subjected to extreme overheating because of the proximity of the torch.

Neither of these solutions can be applied to an existing machine, not already fitted with such a control unit, without substantial alterations to the structure of the machine.

The aim of this invention is to overcome the disadvantages of these existing solutions and to construct a control unit of simple design which can be fitted to a standard machine without structural modifications.

The invention can be applied to torch-cutting machines fitted with a control unit consisting of a first element carried by the cutting-torch carriage and a second element placed on the path followed by the first element during the carriage's travels. The two elements in combination ensure that the carriage is halted when it reaches a predetermined position, dependent on the location of the second element. These elements can be: a cam actuating a switch; a light source with a photo-electric cell; a magnetic body connected to a magnetic field detector, etc. . . .

In existing machines fitted with this kind of control unit, the second element is mounted on the machine frame and its position can be adjusted manually. These machines can only be used if the cast product remains in a central position on the discharge conveyor.

In accordance with the invention, the second element of the control unit is kinematically linked to the grip-bar, situated on the side of the cast product where the cut will begin, in such a way that the movements of the grip-bars move this second element in a direction parallel to the path of the cutting-torch carriage, at a speed equal to and in the same direction as the component parallel to the path of the cutting-torch carriage, of the speed of the end of the grip-bar which comes into contact with the cast product.

This kinematic connection between the grip-bar and the second element of the control unit can be brought about by using various mechanisms. For example, a rack and pinion system, transforming the circular movement of the grip-bar into a linear movement. A system of levers and connecting-rods could also be used.

In one favoured method of constructing the invention, the second element is movable along a straight, horizontal guide and is connected to one of the strands, parallel to the guide, of an endless chain which runs between two gearwheels, one of which is driven round by the grip-bars.

This gearwheel can be driven by means of a segment gear which is wedged onto the grip-bar hinge shaft and which engages with a pinion, locked in rotation with the gearwheel, the ratio of the diameters of the wheel and the pinion being equal to the ratio of the length of the grip-bar to the radius of the segment gear.

The gearwheel can also be driven by means of a second chain, which is attached to an arm integral with the grip-bars and which passes over a pinion locked in rotation with the gearwheel, the ratio of the diameters of the wheel and the pinion being equal to the ratio of the lengths of the grip-bars and the arm. In this solution, the two chains run, respectively, between two wheels or two pinions of the same diameter, the axes of which lie in the same horizontal plane. The corresponding wheels and pinions are coaxial and locked together in rotation in such a manner that the two strands of each chain lie horizontally and the arm is attached to one of the strands of the second chain by a pin and slot connection, which enables the circular movement of the arm to be transformed into a linear movement.

If a slab-cutting machine contains two cutting-torch carriages moving towards each other from opposite sides of the cast product, two control units according to the invention will be used, each carriage being operated by the unit connected to the corresponding grip-bar.

Figure 2:
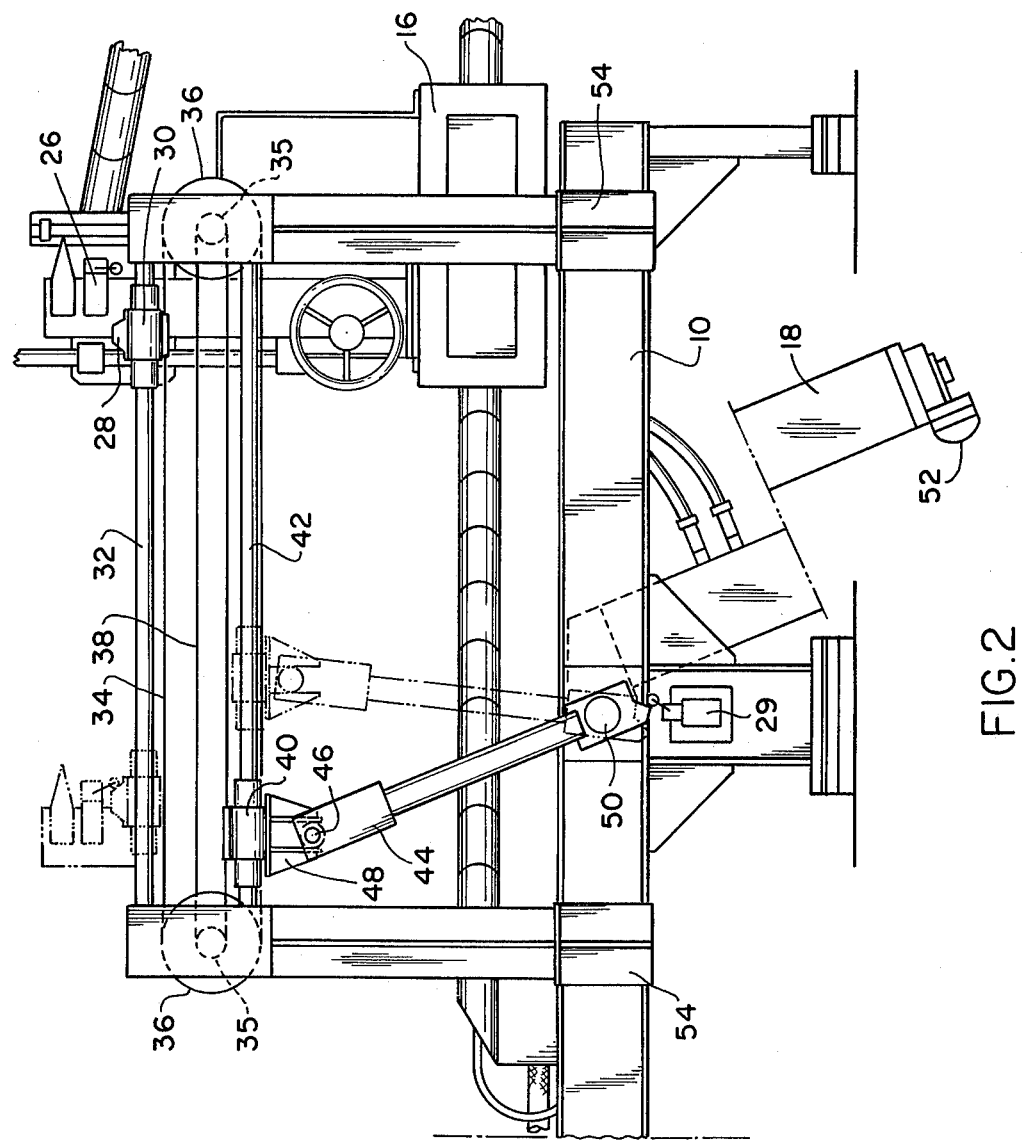

Other features of the invention can be obtained by reading the following description of one of the many ways in which the invention can be constructed. This description refers to the accompanying drawings wherein:

FIG. 1 is a front view of a torch-cutting machine to which the invention is applied; and FIG. 2 shows a control unit as described in this document.

The machine shown in FIG. 1 consists of a frame 10, mounted on wheels, movable, on rails 12 placed on either side of the discharge roller conveyor 14 of a continuous casting machine, in a direction parallel to that of this conveyor.

Two cutting-torch carriages 16 are mounted on the front of this frame and move horizontally by means of rack and pinion systems, in directions at right angles to the direction of the conveyor 14. When they are at rest, the two carriages 16 are situated on either side of the conveyor 14, as can be seen in FIG. 1.

Grip-bars 18, hinged on shafts running parallel to the conveyor 14, are mounted on the rear of the frame: they can be set in motion by a cylinder 20 so that they grip the sides of the slab 22, thus permitting the machine to be carried along at the same speed as the slab.

The grip-bars are actuated by a measuring device as soon as the section of slab beyond the cutting-torches is of the desired length. Once the grip-bars are in place, the cutting-torch carriages are set in motion so as to move the cutting-torches 24 towards the slab edges. When the cutting-torches reach the slab edges, each carriage is halted by a switch 26 actuated by a cam 28 (FIG. 2). At the same time the torches are fed with fuel gas and ignited by means of a pilot. After a predetermined waiting period, during which time the area of the slab where the cut will begin is preheated, the carriages are set in motion once more and move towards the centre of the slab. One of the carriages 16 is halted just before it reaches the centre of the slab. The torch that it carries is extinguished and the carriage is then brought back sufficiently far to allow the second carriage to continue on its journey until the slab is completely cut. This second carriage is then stopped and, after its torch has been extinguished, is returned to its starting position at the same time as the first carriage. The grip-bars are then removed from the slab and the machine is returned to its original position by means of a motor which drives the wheels. The opening movement of the grip-bars is stopped by limit-switches 29 (FIG. 2).

Each cam is mounted on a collar 30 which can slide without appreciable friction, thanks to two ball bushings, along a guide bar 32 running parallel to the path of the carriage 16. The sliding collar 30 is attached to an endless chain 34 which runs between two gearwheels 36 of equal diameter. A toothed pinion 35 is cottered to the axle of each of the two gearwheels and an endless chain 38 runs between the two pinions.

A sliding collar 40 is mounted, like the sliding collar 30, on a guide bar 42, parallel to guide bar 32 and is attached to the chain 38. The movements of the sliding collar 40 along the bar 42 are controlled by an arm 44, locked in rotation with the grip-bar 18; the end of this arm consists of a roller engaged with a fork 48, which is in turn attached to the sliding collar 40. The arm 44 is cottered to the shaft 50 onto which the grip-bar is hinged, and is positioned in such a way that the centre lines of the roller 46 and the shaft 50 and the centre of the grip-bar shoe 52, which grips the side of the slab, lie in the same plane. The ratio of the diameters of the wheels 36 and the pinions 35 is equal to the ratio of the distances between, on the one hand, the centre line of the shaft 50 and the centre of the shoe 52, and on the other hand, between the centre lines of the roller 46 and the shaft 50. This connection enables the cam 28 to reproduce the horizontal movement of the grip-bar shoe 52, and when the shoe is in contact with the side of the slab, the cam 28 is positioned in such a manner that the torch carried by the carriage 16 stops right at the edge of the slab when the switch 26 is actuated by the cam. This occurs whatever the width of the slab or its position on the conveyor 14.

FIG. 2 shows the control unit operating the right-hand carriage. An identical unit operates the left-hand carriage.

The bars 32 and 42 and the shaft bearings of the wheels 36 and the pinions 35 are supported by pillars 54 fixed to the machine frame. This unit as a whole is self-contained and can easily be fitted to a machine of standard design without requiring modifications to the machine.

What we claim is:

1. Control unit for torch-cutting machine fitted with bars, hinged on the machine frame, which grip the sides of the cast product and ensure that the machine and the cast product move along together, as well as at least one cutting-torch carriage, which is movable in a direction at right angles to that of the machine, this control unit consisting of a first element carried by the cutting-torch carriage and a second element placed on the path followed by the first element during the carriage's travels, the two elements in combination ensuring that the carriage is halted when it reaches a predetermined position, and being characterized by the fact that the second element is kinematically linked to the grip-bar situated on the side of the cast product where the cut will begin, in such a way that the movements of the grip-bar move this second element in a direction parallel to the path of the cutting-torch carriage, at a speed equal to and in the same direction as the component, parallel to the path of the cutting-torch carriage, of the speed of the end of the grip-bar which comes into contact with the cast product.

2. Control unit as claimed in claim 1, characterized by the fact that the second element is movable along a straight horizontal guide and is connected to one of the strands, parallel to the guide, of an endless chain which runs between two gearwheels, one of which is driven round by the grip-bar.

3. Control unit as claimed in claim 2, characterized by the fact that is contains a segment gear, cottered to the grip-bar hinge shaft, which engages with a pinion locked in rotation with one of the gearwheels, the ratio of the diameters of said gearwheel and pinion being equal to the ratio of the length of the grip-bar to the radius of the segment gear.

4. Control unit as claimed in claim 2, characterized by the fact that it contains an arm, locked in rotation with the grip-bar and attached to a second chain which engages with a pinion locked in rotation with one of the gearwheels, the ratio of the diameters of said gearwheel and the pinion being equal to the ratio of the lengths of the grip-bar and the arm.

5. Control unit as claimed in claim 4, characterized by the fact that the first chain runs between two gearwheels of equal diameter with axes in the same horizontal plane, and the second chain between two pinions of equal diameter, coaxial to the gear wheels and locked in rotation with them, and the arm is attached to one of the strands of the second chain by a stird and fork connection, enabling the circular movement of the arm to be transformed into a linear movement.

* * * * *